Aug. 8, 1939.  C. W. LANGE  2,169,100

DYNAMO-ELECTRIC MACHINE

Filed Dec. 21, 1938

Inventor:
Carl W. Lange,
by Harry E. Dunham
His Attorney.

Patented Aug. 8, 1939

2,169,100

UNITED STATES PATENT OFFICE 2,169,100

DYNAMO-ELECTRIC MACHINE

Carl W. Lange, Erie, Pa., assignor to General Electric Company, a corporation of New York Application December 21, 1938, Serial No. 247,073

6 Claims. (Cl. 171—252)

My invention relates to dynamo-electric machines, and more particularly to the stationary field exciting system for such machines.

The object of my invention is to provide an improved dynamo-electric machine excitation system.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
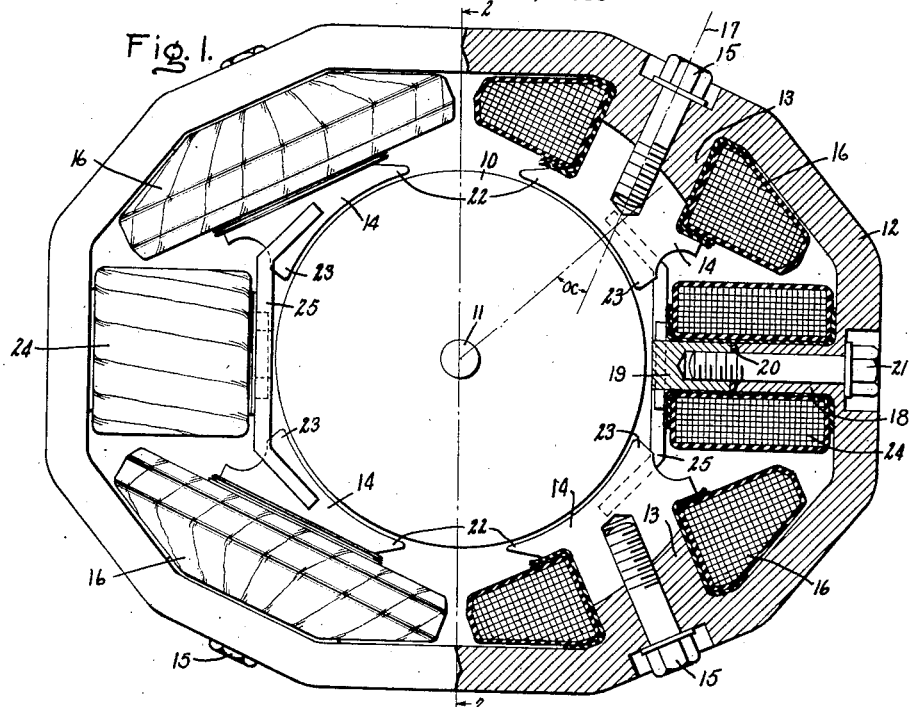
Figure 2:
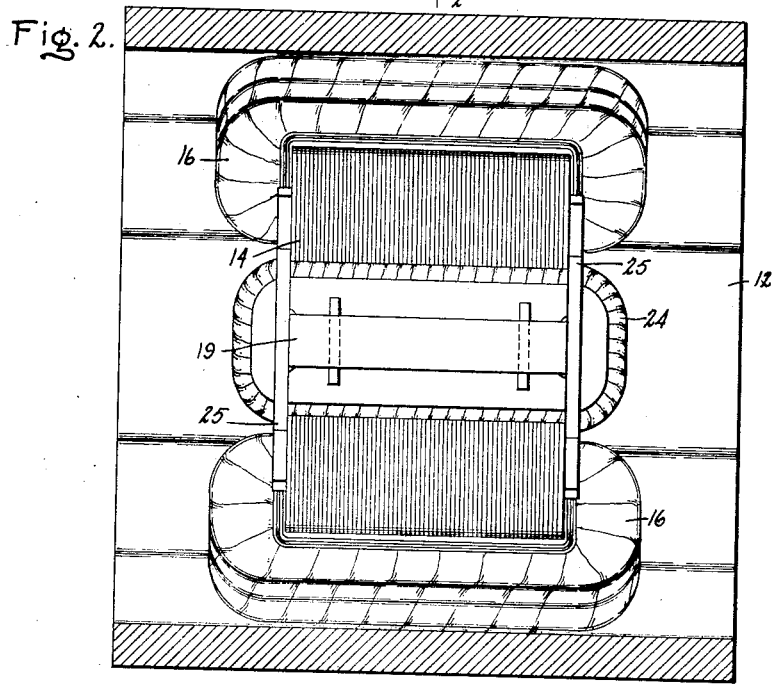

For a better understanding of my invention, reference is made to the accompanying drawing wherein Fig. 1 is a transverse elevational view, partly in section, of a dynamo-electric machine embodying my invention and having an end shield removed; and Fig. 2 is a side elevational view taken along line 2—2 of Fig. 1, with the rotatable member removed.

Referring to the drawing, I have shown a dynamo-electric machine having a rotatable member 10 mounted on a shaft 11 and adapted to rotate with respect to a stationary member 12. The stationary member 12 is provided with a field excitation system which includes four main pole pieces, each of which is formed of two sections 13 and 14 of magnetic material. The inner laminated section 14 is secured to the frame section 13 by a bolt 15 and is adapted to be electro-magnetically excited by a main field exciting winding 16. In order to provide a low height motor, such as is often required for driving equipment where the space for the motor is very restricted, the stationary member frame 12 is made with a greater transverse width along one transverse axis, as shown in the horizontal direction in Fig. 1, than on another transverse axis as shown in the vertical direction in Fig. 1. In order to utilize most efficiently the space available between the rotatable member 10 and the frame 12, the axes 17 of the main pole pieces are angularly displaced from normal to the rotatable member by an angle α, that is, the axes 17 of these pole pieces are displaced by an angle α with respect to a radius of the rotatable member 10. By thus displacing the axes of the main pole pieces, a sufficient space is provided for the main field exciting windings 16.

In order to provide a commutating flux to such a machine, the main pole pieces are arranged in pairs more closely adjacent each other toward the smaller width axis of the machine than toward the greater width transverse axis, so as to provide an interpolar space on each side of the machine along the greater width transverse axis thereof, and interpole pieces are arranged in this interpolar space. These interpole or commutating pole pieces are formed of two sections 18 and 19 of magnetic material and are spaced apart by a spacing element or shim 20 of non-magnetic material. A bolt 21 secures together the sections 18 and 19 and the shims 20 of these commutating poles. This construction would tend to produce an unsymmetrical distribution of magnetic flux in the air gap if the usual type symmetrical pole faces were provided on the main pole pieces, and in order to provide for the desired commutating flux, the pole faces of the main pole pieces are also dissymmetrically formed. These pole faces are provided with the usual pole tips 22 adjacent the small transverse axis of the machine and are formed with a relatively short pole tip 23 on the side of the pole faces toward the greater width transverse axis of the machine. With this arrangement, the pole face on each of the main pole pieces extends arcuately further towards the next adjacent main pole piece than towards the next adjacent interpole piece from the axis of the main pole pieces. With this arrangement, the tips 23 of the pole faces towards the commutating poles are of a larger section than the ends of the pole faces 22 towards the next adjacent main pole piece, and this permits an increased leakage between the commutating poles and adjacent main pole face tips 23. Such a construction tends to produce an undesirable shielding effect on the commutating poles and an increased cross-magnetizing effect on the main magnetic flux due to armature reaction. The unsymmetrical pole face tip lengths tend to compensate for these effects.

The speed of dynamo-electric machines, such as these motors, may be varied by adjusting the strength or excitation of the main field. With such a speed control, the commutating pole excitation cannot be controlled entirely by the excitation of the commutating field exciting windings, as these windings are energized in accordance with the armature current of the rotatable member 10. The commutating pole pieces, therefore, are provided with commutating field exciting windings 24 to provide the desired commutating field flux under normal load conditions with normal main pole excitation. These commutating field exciting windings are arranged to extend substantially from the main field exciting winding on one side to the winding on the other side, so as to utilize substantially all the space between pole piece cores for field exciting windings and to provide as compact a structure as possible. When the excitation of the main pole pieces is varied, the saturation of the main pole pieces and that of the commutating pole pieces tends to vary the magnetization curves of these pole pieces, so that the commutating field flux must be varied by other means than the load current through field exciting windings 24 to obtain the most desirable commutation. I have found that by arranging shunts 25 of magnetic material to be saturated under normal load and normal field excitation conditions, the desired commutating flux can be obtained over a very wide range of speed and load conditions. These shunts are mechanically secured to the outer edges of the sections 19 of the commutating pole pieces, and extend to adjacent the outside of adjacent main pole pieces 14, so as to shunt a portion of the commutating flux around the armature 10 when the main field excitation is below normal. By arranging these magnetic shunts 25 adjacent the outer edges of the commutating pole pieces, I have found that they have very little effect on the magnetic flux distribution in the air gap and armature core under the faces of the commutating pole pieces, and they serve merely as saturable magnetic shunts outside the commutating zone. The commutating field exciting windings 24 are arranged to provide a sufficient excitation under normal load conditions to compensate for the flux which is shunted through the magnetic shunts 25, and in addition, to provide the desired commutating flux due to the added reluctance resulting from the non-magnetic shims 20. It has been found that this construction provides a field excitation system for a dynamo-electric machine substantially as desirable as that of a symmetrically arranged field excitation system, and in addition, provides a stationary member having a minimum height which utilizes substantially all of the interpolar spaces for the field exciting windings of the pole pieces.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a rotatable member and a stationary member, said stationary member having a greater transverse width on one axis than on another transverse axis, main pole pieces for said stationary member having their axes angularly displaced from normal to said rotatable member, said main pole pieces being arranged about said stationary member to provide an interpolar space between adjacent main pole pieces along the greater transverse width of said stationary member, and pole faces on each of said main pole pieces of greater arcuate length from the axis of said pole pieces towards the smaller width axis than towards the greater width axis of said stationary member.

2. A dynamo-electric machine having a rotatable member and a stationary member, said stationary member having a greater transverse width on one axis than on another transverse axis, main pole pieces for said stationary member having their axes angularly displaced from normal to said rotatable member, said main pole pieces being arranged about said stationary member to provide an interpolar space between adjacent main pole pieces along the greater transverse width of said stationary member, interpole pieces arranged in the interpolar space along the greater width axis of said stationary member between adjacent main pole pieces, and a pole face on each of said main pole pieces extending arcuately further towards the next adjacent main pole piece than towards the next adjacent interpole piece from the axis of the main pole pieces.

3. A dynamo-electric machine having a rotatable member and a stationary member, said stationary member having a greater transverse width on one axis than on another transverse axis, main pole pieces for said stationary member having their axes angularly displaced from normal to said rotatable member, said main pole pieces being arranged about said stationary member to provide an interpolar space between adjacent main pole pieces along the greater transverse width of said stationary member, interpole pieces arranged with their axes along the greater width axis of said stationary member and arranged in said interpolar space between main pole pieces, and means including magnetic shunts secured to said interpole pieces and extending to closely adjacent to adjacent main pole pieces and arranged to saturate magnetically under normal load on said dynamo-electric machine.

4. A dynamo-electric machine having a rotatable member and a stationary member, said stationary member having a greater transverse width on one axis than on another transverse axis, main pole pieces for said stationary member having their axes angularly displaced from normal to said rotatable member, said main pole pieces being arranged about said stationary member to provide an interpolar space between adjacent main pole pieces along the greater transverse width of said stationary member, interpole pieces arranged with their axes along the greater width axis of said stationary member and arranged in said interpolar space between main pole pieces, said interpoles being formed of two sections of magnetic material spaced apart by a non-magnetic element and secured together, and means including magnetic shunts secured to said interpole pieces and extending to closely adjacent main pole pieces and arranged to saturate magnetically under normal load on said dynamo-electric machine.

5. A dynamo-electric machine having a rotatable member and a stationary member, said stationary member having a greater transverse width on one axis than on another transverse axis, main pole pieces for said stationary member having their axes angularly displaced from normal to said rotatable member, said main pole pieces being arranged about said stationary member to provide an interpolar space between adjacent main pole pieces along the greater transverse width of said stationary member, pole faces on each of said main pole pieces of greater arcuate length from the axis of said pole pieces towards the smaller width axis than towards the greater width axis of said stationary member, interpole pieces arranged with their axes along the greater width axis of said stationary member and arranged in said interpolar space between main pole pieces, and means including magnetic shunts secured to said interpole pieces and extending to closely adjacent to adjacent main pole pieces and arranged to saturate magnetically under normal load on said dynamo-electric machine.

6. A dynamo-electric machine having a rotatable member and a stationary member, said stationary member having a greater transverse width on one axis than on another transverse axis, main pole pieces for said stationary member having their axes angularly displaced from normal to said rotatable member, said main pole pieces being arranged about said stationary member to provide an interpolar space between adjacent main pole pieces along the greater transverse width of said stationary member, pole faces on each of said main pole pieces of greater arcuate length from the axis of said pole pieces towards the smaller width axis than towards the greater width axis of said stationary member, interpole pieces arranged with their axes along the greater width axis of said stationary member and arranged in said interpolar space between main pole pieces, and a field exciting winding on each of said pole pieces extending substantially from one adjacent pole piece field exciting winding to the next adjacent pole piece field exciting winding.

CARL W. LANGE.